(12) United States Patent
Kurihara et al.

(10) Patent No.: US 8,732,130 B2
(45) Date of Patent: May 20, 2014

(54) VIRTUALIZATION SWITCH, COMPUTER SYSTEM, AND DATA COPY METHOD

(75) Inventors: Takuya Kurihara, Kawasaki (JP);
Masakazu Sakamoto, Kawasaki (JP);
Toshiaki Takeuchi, Kawasaki (JP);
Atsushi Shinohara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 467 days.

(21) Appl. No.: 12/365,431

(22) Filed: Feb. 4, 2009

(65) Prior Publication Data
US 2009/0198745 A1   Aug. 6, 2009

(30) Foreign Application Priority Data
Feb. 5, 2008   (JP) .................. 2008-025174

(51) Int. Cl.
*G06F 7/00* (2006.01)
*G06F 17/00* (2006.01)
*G06F 17/30* (2006.01)

(52) U.S. Cl.
CPC .... *G06F 17/30082* (2013.01); *G06F 17/30094* (2013.01); *G06F 17/30115* (2013.01); *G06F 17/30144* (2013.01); *G06F 17/30067* (2013.01); *G06F 17/30315* (2013.01); *G06F 17/30424* (2013.01); *G06F 17/30592* (2013.01); *G06F 17/30212* (2013.01); *G06F 17/30578* (2013.01); *G06F 17/30097* (2013.01); *G06F 17/30159* (2013.01); *G06F 17/30197* (2013.01); *G06F 17/30545* (2013.01); *G06F 17/3089* (2013.01)
USPC ............................. 707/652; 707/640; 707/649

(58) Field of Classification Search
CPC .................... G06F 17/30094; G06F 17/30115; G06F 17/30082; G06F 17/30144; G06F 17/30067; G06F 17/30315; G06F 17/30424; G06F 17/30592; G06F 17/30212; G06F 17/30578; G06F 17/30097; G06F 17/30159; G06F 17/30197; G06F 17/30545; G06F 17/3089
USPC .......................................... 707/640, 649, 652
See application file for complete search history.

(56) References Cited

U.S. PATENT DOCUMENTS 7,287,116 B2 *  10/2007  Iwami et al. ...................... 711/6
7,437,705 B1 *  10/2008  O'Bryan et al. ............... 717/100

(Continued)

FOREIGN PATENT DOCUMENTS

| JP | 2003-44421  | 2/2003  |
| JP | 2005-141344 | 6/2005  |
| JP | 2005-322230 | 11/2005 |

*Primary Examiner* — Apu Mofiz
*Assistant Examiner* — Jared Bibbee
(74) *Attorney, Agent, or Firm* — Staas & Halsey LLP

(57) ABSTRACT

A virtualization switch connected to a host computer and a plurality of physical storage devices includes a plurality of communication line connection terminals and storage virtualizing unit allowing the host computer to recognize a storage area generated by combining some or all of storage areas of the plurality of physical storage devices as a virtual storage device, a plurality of copy process unit copying data in the storage area, and control unit controlling a copy process operation by assigning copy sessions based on instructions from the host computer to the plurality of copy process unit. When the number of copy process units is larger than number of copy sessions, the control unit performs control to distribute part of a copy process in the one or copy process units that are currently performing the copy process to the one or more copy process units that are not performing the copy process.

3 Claims, 7 Drawing Sheets

(56) References Cited

U.S. PATENT DOCUMENTS

| | | |
|---|---|---|
| 2005/0097272 A1 | 5/2005 | Jiang et al. |
| 2005/0204356 A1* | 9/2005 | Sundararajan et al. ....... 717/176 |
| 2005/0251547 A1 | 11/2005 | Bello et al. |
| 2006/0015684 A1* | 1/2006 | Schnapp et al. .............. 711/114 |
| 2006/0206603 A1* | 9/2006 | Rajan et al. ................... 709/223 |

* cited by examiner

VIRTUALIZATION SWITCH, COMPUTER SYSTEM, AND DATA COPY METHOD

CROSS REFERENCES TO RELATED APPLICATIONS

This application is related to and claims priority to Japanese patent application no. 2008-025174 filed on Feb. 5, 2008 in the Japan Patent Office, the entire contents of which are incorporated by reference herein.

FIELD

The present invention relates to a virtualization switch that can be connected to a host computer and a plurality of physical storage devices, a computer system including the virtualization switch, and a data copy method in the virtualization switch.

BACKGROUND

In a computer system particularly including a plurality of storage devices, storage virtualization for allowing a host computer to recognize a storage area generated by combining storage areas of a plurality of physical storage devices as a virtual storage device has been suggested.

For example, a computer system illustrated in FIG. 7 has been known (e.g., see Japanese Laid-open Patent Publication No. 2003-044421). In this computer system, a plurality of host computers (node devices) 1 and a plurality of physical storage devices 2 are mutually connected via a fibre channel switch (network switch) 3 by using fibre channels, some or all of storage areas of the physical storage devices 2 are combined to constitute a virtual storage device (virtual sharing disk) 5 by a network processor 4 of the fibre channel switch 3, and the virtual storage device 5 is provided such that the host computers 1 can access the virtual storage device 5.

According to such storage virtualization using a fibre channel switch, a user can freely construct a virtual storage device suitable for the application of a host computer. By accessing the virtual storage device, the host computer can advantageously use physical storage devices without being conscious of the storage capacity and connection form of the respective physical storage devices.

Furthermore, in the fibre channel switch, data may be copied between virtual storage devices.

Copy of data between virtual storage devices in the fibre channel switch is usually performed by DPCs (Data Path Controllers) of connection ports connected to fibre channels.

In a usual case, the fibre channel switch is provided with a plurality of connection ports and a plurality of DPCs, the number thereof being the same as the number of the connection ports.

Thus, when the number of copy sessions based on instructions from a host computer is equal to or larger than the number of DPCs, a copy process ability can be sufficiently ensured by efficiently assigning the copy sessions to the DPCs in the fibre channel switch (e.g., see Japanese Laid-open Patent Publication No. 2005-322230).

When the number of copy sessions is smaller than the number of DPCs in the fibre channel switch, a free DPC that does not perform a copy session exists. The existence of such a free DPC is inefficient, and the copy process ability can be further enhanced by effectively using the free DPC.

SUMMARY

A virtualization switch connected to a host computer and a plurality of physical storage devices includes a plurality of communication line connection terminals and storage virtualizing unit allowing the host computer to recognize a storage area generated by combining some or all of storage areas of the plurality of physical storage devices as a virtual storage device, a plurality of copy process units copying data in the storage area, and control unit controlling a copy process operation by assigning copy sessions based on instructions from the host computer to the plurality of copy process units. When the number of copy process unit is larger than the number of copy sessions, the control unit performs control to distribute part of a copy process in a copy process unit that is currently performing the copy process to a copy process unit that is not performing the copy process.

A computer system including a host computer, a plurality of physical storage devices, and a virtualization switch that can be connected to the host computer and the plurality of physical storage devices. The virtualization switch includes a plurality of communication line connection terminals, a storage virtualizing unit allowing the host computer to recognize a storage area generated by combining some or all of storage areas of the plurality of physical storage devices as a virtual storage device, a plurality of copy process units capable of copying data in the storage area virtualized by the storage virtualizing unit, and a control unit controlling a copy process operation by assigning copy sessions based on instructions from the host computer to the plurality of copy process units. When the number of copy process units is larger than the number of copy sessions, the control unit performs control to distribute part of a copy process in one or more copy process units that are currently performing the copy process to one or more copy process units that are not performing the copy process.

A data copy method for copying data in a storage area virtualized by a storage virtualizing unit in a virtualization switch that can be connected to a host computer and a plurality of physical storage devices through communication lines and that includes a plurality of communication line connection terminals, the storage virtualizing unit allowing the host computer to recognize a storage area generated by combining some or all of storage areas of the plurality of physical storage devices as a virtual storage device, the data copy method including assigning copy sessions to a plurality of copy process units based on instructions from the host computer and distributing part of the copy process performed in a copy process unit that is currently performing the copy process to a copy process unit that is not performing the copy process when the number of copy process units is larger than the number of copy sessions.

DESCRIPTION OF EMBODIMENT

Hereinafter, an embodiment for realizing a virtualization switch and a computer system is described.

Figure 1:
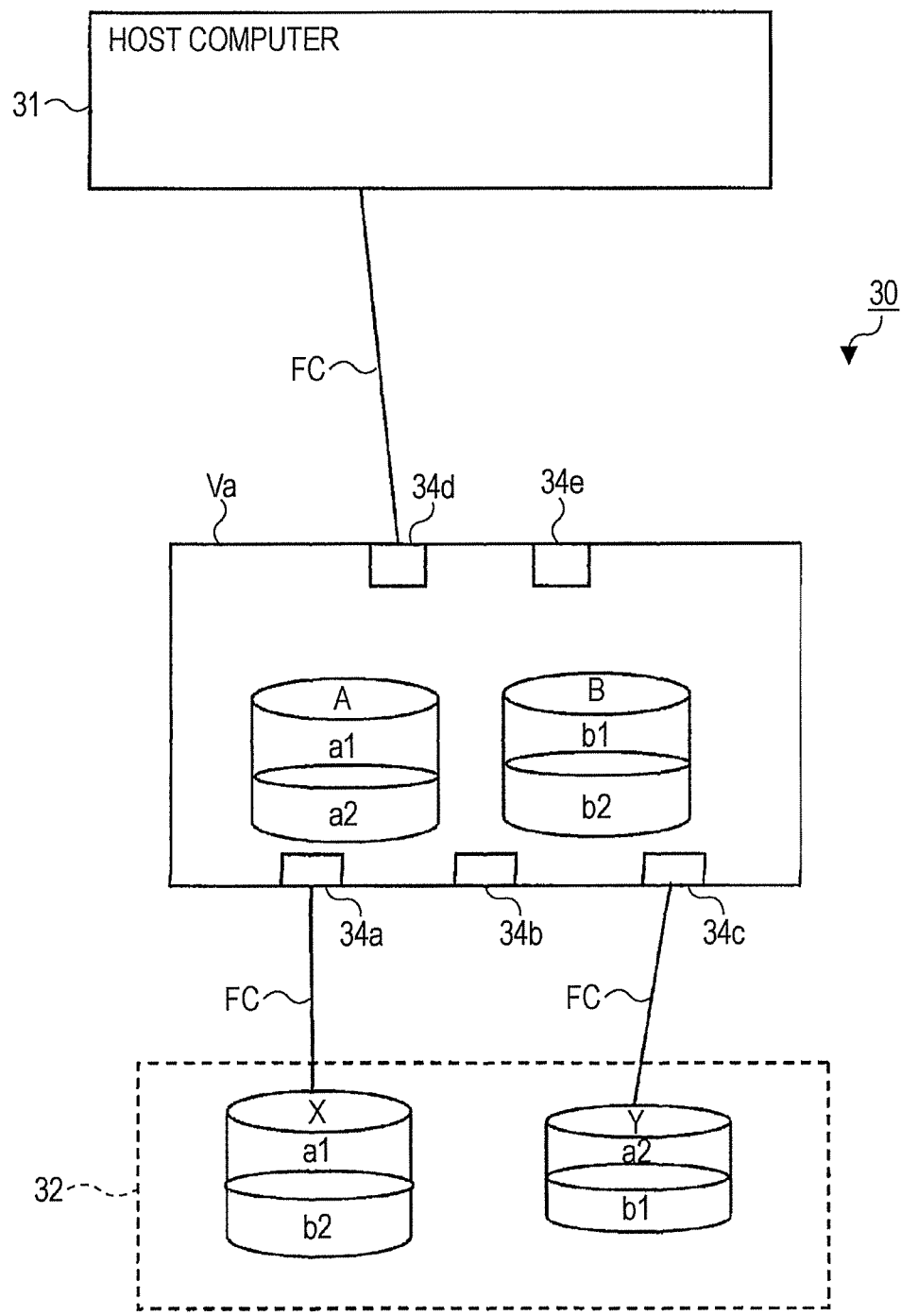
FIG. 1 is an illustration of a configuration of a computer system.

A configuration of a computer system 30 according to an embodiment of the invention is illustrated in FIG. 1. With reference to FIG. 1, the entire configuration of the computer system 30 is described.

In the computer system 30 according to the embodiment, a host computer 31 connects to a fibre channel switch Va through a fibre channel FC. The fibre channel switch Va connects to a RAID (Redundant Arrays of Inexpensive Disks) storage device 32 including two physical storage devices X and Y through fibre channels FC.

The fibre channel switch Va enables the host computer 31 to recognize a virtual storage device. In the fibre channel switch Va according to the embodiment, a virtual storage device A is formed by combining a part a1 of the physical storage device X and a part a2 of the physical storage device Y. Also, a virtual storage device B is formed by combining a part b1 of the physical storage device Y and a part b2 of the physical storage device X. The fibre channel switch Va provides the virtual storage devices A and B such that the host computer 31 can access the virtual storage devices A and B.

Figure 2:
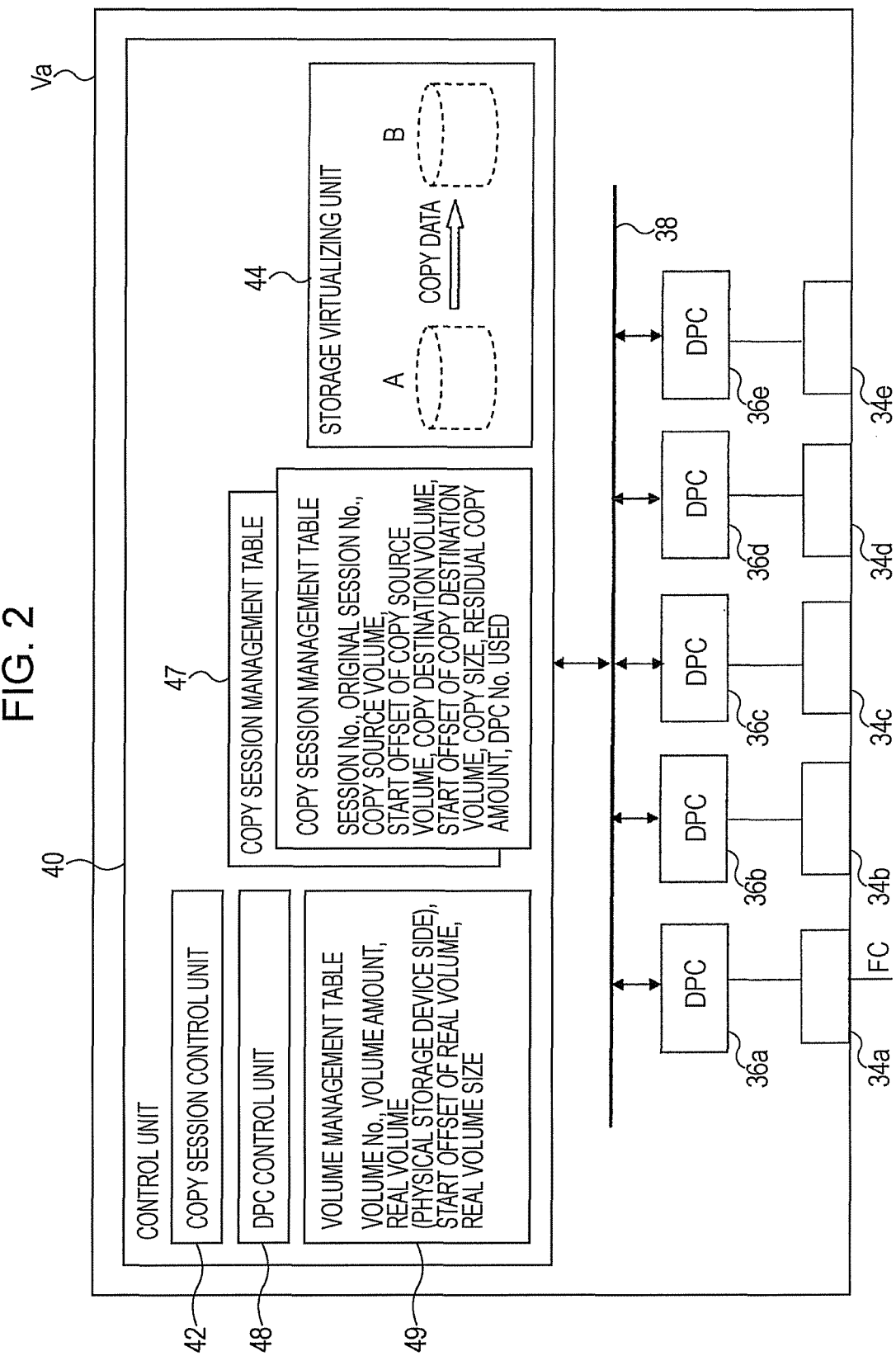
FIG. 2 is a block diagram illustrating a configuration of a virtualization switch (fibre channel switch)

Hereinafter, the fibre channel switch Va according to the embodiment is described with reference to FIG. 2. FIG. 2 is a block diagram illustrating a configuration of the fibre channel switch Va according to the embodiment.

The fibre channel switch Va includes a plurality of fibre channel connection terminals 34a to 34e connectable to the host computer 31 and the RAID storage device 32 through fibre channels. DPCs 36a to 36e to control a communication line are provided for the fibre channel connection terminals 34a to 34e, respectively. The DPCs 36a to 36e have a function of performing a copy process between the virtual storage devices A and B. In a usual case, each DPC performs a process of one copy session. The respective DPCs 36a to 36e are mutually connected so that they can communicate with each other through an internal bus 38.

A fibre channel cable including a coaxial cable or an optical fiber cable compatible with the fibre channel FC can be connected to each of the fibre channel connection terminals 34a to 34e. The host computer 31 and the RAID storage device 32 connect to the fibre channel connection terminals 34a to 34e through the fibre channel cables.

The fibre channel switch Va includes a control unit 40 including a CPU (Central Processing Unit), an LSI (Large-Scale Integration), and a memory. The control unit 40 can realize storage virtualizing unit 44 by allowing the CPU to execute a firmware program stored in a ROM (Read Only Memory) or executing the function of the LSI.

The storage virtualizing unit 44 provides the virtual storage devices A and B, which are storage areas generated by combining parts of storage areas of the physical storage devices X and Y connected via the fibre channel connection terminal 34a, to the host computer 31, as illustrated in FIG. 1. The configuration of the virtual storage devices realized by the fibre channel switch Va is not limited to the above-described configuration. Virtual storage devices can be configured by freely combining all or some of storage areas of many connected physical storage devices.

The storage virtualizing unit 44 accesses corresponding areas of the physical storage devices X and Y via the fibre channel connection terminals 34 on the basis of access signals to the virtual storage devices A and B input from the host computer 31 via the fibre channel connection terminals 34a to 34e. Also, the control unit 40 stores a copy session control program and a DPC control program.

When the copy session control program is read and executed, copy session control unit 42 for assigning a plurality of copy sessions to the DPCs 36a to 36e is realized. When the DPC control program is read and executed, DPC control unit 48 for controlling the respective DPCs 36a to 36e on the basis of the assignment performed by the copy session control unit 42 is realized.

In a memory area of the control unit 40, copy session management tables 47 to manage information of respective copy sessions and a volume management table 49 to manage data of respective volumes are formed. The copy session management table 47 stores, on the basis of instructions from the host computer 31 or control by the copy session control program 42, data necessary to manage the copy session, such as session No., original session No., copy source volume, start offset of copy source volume, copy destination volume, start offset of copy destination volume, copy size, residual copy amount, and DPC No. used.

On the other hand, the volume management table 49 stores data necessary for a copy process, such as volume No., volume amount, real volume on the physical storage device side, start offset of real volume, and real volume size. Instructions about copy sessions are received by the control unit 40 from the host computer 31 through the fibre channel cable.

The control unit 40 that has received the instructions about copy sessions generates the copy session management tables 47 for the respective copy sessions in the memory of the control unit 40. Then, the control unit 40 stores the instructions from the host computer 31 in the copy session management tables 47.

The copy session control unit 42 decides assignment of the respective copy sessions to the DPCs and instructs the DPC control unit 48 to perform a copy process in the DPCs. After deciding assignment of the copy sessions, the copy session control unit 42 stores DPC numbers of the DPCs assigned with the copy sessions in the copy session management tables 47.

Upon receiving the instructions from the copy session control unit 42, the DPC control unit 48 outputs instruction signals to the DPCs assigned with the copy sessions. Also, the DPC control unit 48 performs control to start a copy operation based on the instructions from the host computer 31.

After a copy session actually starts in any of the DPCs, the DPC control unit 48 constantly monitors the progress of the copy process in the respective DPCs. Then, the copy session control unit 42 receives an operation status of each DPC from the DPC control unit 48 and stores a residual data amount in the respective copy session management tables 47.

Figure 3:
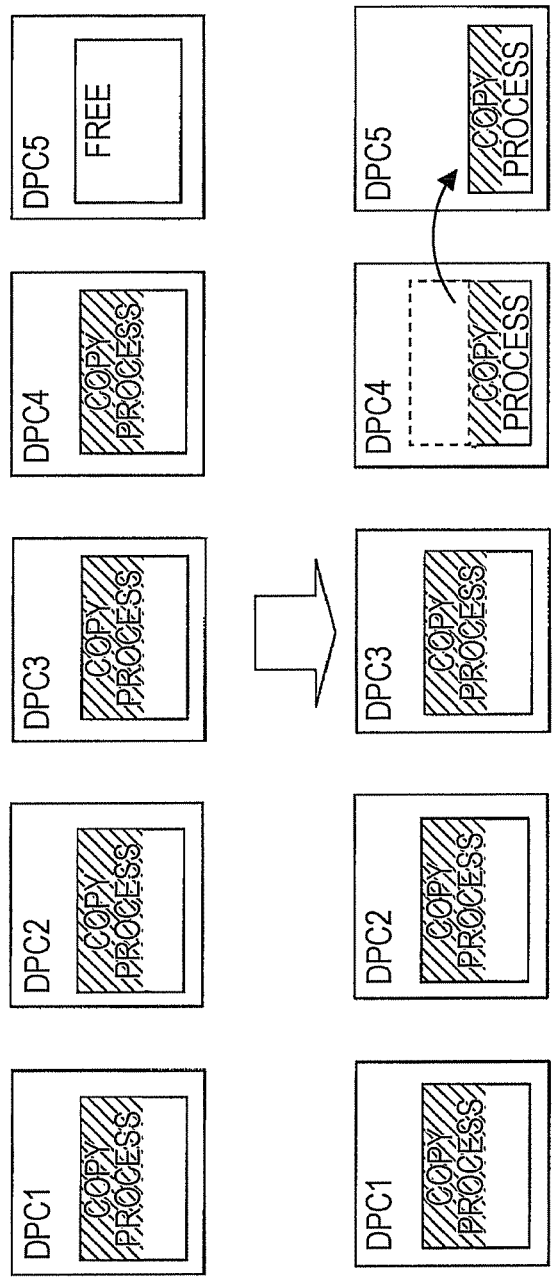
FIG. 3 is a schematic illustration of division control of copy sessions in the virtualization switch.
Figure 4:
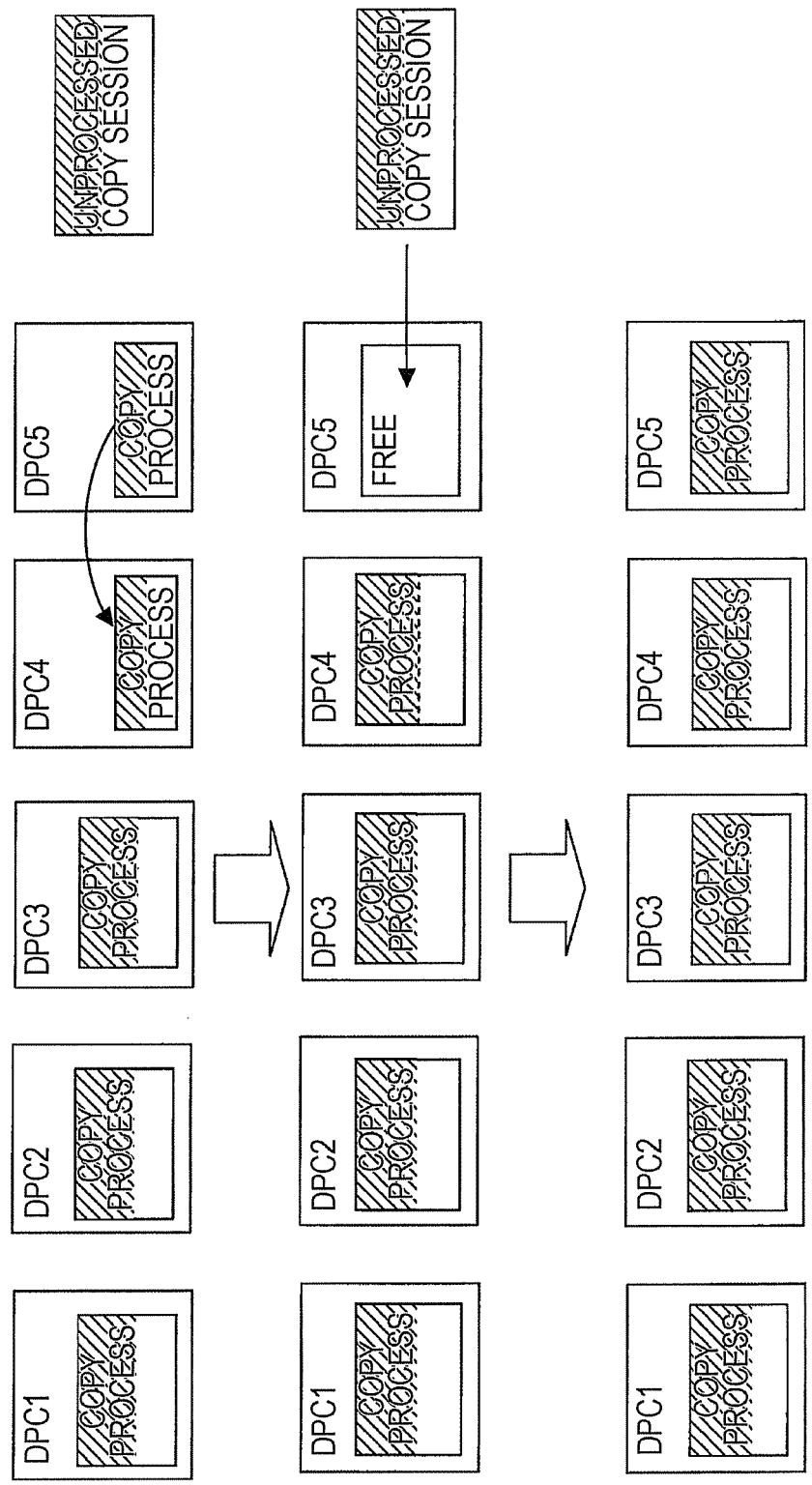
FIG. 4 is a schematic illustration of division cancel control of copy sessions in the virtualization switch.

An outline of a control operation performed by the copy session control unit 42 and the DPC control unit 48 according to this embodiment is described below with reference to FIGS. 3 and 4. First, the case where the number of DPCs is larger than the number of copy sessions is described with reference to FIG. 3. In this case, a free DPC exists, and thus a copy process can be efficiently performed by using the free DPC.

For example, assume that there are five DPCs and four copy sessions. Under this condition, a copy process is performed in four DPCs 1 to 4 and DPC 5 is free in the conventional art. In this embodiment, however, any of the four copy sessions is divided into two copy sessions, and one of the two copy sessions is assigned to DPC 5.

The copy session control unit 42 refers to the respective copy session management tables 47 so as to determine whether a free DPC exists. In addition to the copy session management tables 47, DPC management tables (not illustrated) may be generated for the respective DPCs so as to manage a usage status of the DPCs. In that case, the copy session control unit 42 can easily determine whether a free DPC exists by referring to the DPC management tables.

The copy session to be divided is selected by the copy session control unit 42 on the basis of whether a copy process straddling the physical storage devices X and Y is performed in the copy session. Whether the copy session straddles the physical storage devices X and Y can be determined by the copy session control unit 42 by referring to data about the copy source volume stored in the copy session management table 47 and the real volume stored in the volume management table 49.

If there is a copy session straddling the physical storage devices X and Y, the copy session control unit 42 decides to divide the copy session at the border between the physical storage devices X and Y. Then, the copy session control unit 42 instructs the DPC control unit 48 to allow the free DPC 5 to perform a copy process of the divided copy session. When the copy session straddles the physical storage devices X and Y, data can be easily divided at the border thereof.

In response to the instructions from the copy session control unit 42, the DPC control unit 48 allows DPC 5 to perform a copy process of the assigned copy session. Also, the copy session control unit 42 generates a new copy session management table 47 for the copy session generated through the division.

If there is no copy session straddling the physical storage devices X and Y as a result of reference to the copy session management tables 47 and the volume management table 49 by the copy session control unit 42, the copy session control unit 42 searches the respective copy session management tables 47 so as to determine the copy session having a largest amount of residual data.

The copy session control unit 42 equally divides the residual data of the copy session having a largest amount of residual data on the basis of the respective copy session management tables 47, and instructs the DPC control unit 48 to allow the free DPC 5 to perform a copy process of the divided copy session. The copy session control unit 42 generates a new copy session management table 47 for the copy session generated through the division.

In response to the instructions from the copy session control unit 42, the DPC control unit 48 allows DPC 5 assigned with the divided copy session to perform a copy process. In this way, the copy process can be performed more quickly by assigning a copy session generated through division to the free DPC 5.

Furthermore, another free DPC may be generated after any of the copy sessions has ended. After any of the copy sessions has ended, the DPC control unit 48 notifies the copy session control unit 42 of the end of the copy session. Then, the copy session control unit 42 deletes the content of the copy session management table 47 of the copy session that has ended.

In this way, the copy session control unit 42 recognizes that a free DPC has been generated. Then, the copy session control unit 42 and the DPC control unit 48 divides any of the residual copy sessions in the above-described manner, so that the free DPC performs a copy process of the copy session generated through the division. This process is repeatedly performed.

As described above, in the case where the number of DPCs is larger than the number of copy sessions, a copy process is distributed so that there is no DPC not performing a copy process. Accordingly, the copy process can be efficiently performed and the copy process ability can be enhanced.

Next, the case where the number of copy sessions is larger than the number of DPCs is described with reference to FIG. 4. For example, assume that there are five DPCs and that a copy process is performed by assigning copy sessions generated through division to two DPCs 4 and 5 among the five DPCs. Under this condition, assume that a new copy session is generated. The new copy session has of course a larger residual copy amount, and thus it is inefficient to keep the new copy session waited.

Thus, the division of the copy session is canceled and the copy session is assigned to DPC 4. Then, DPC 5 is allowed to perform a copy process of the new copy session. More specifically, the copy session control unit 42 receives instructions about a new copy session from the host computer 31. Then, if there exists a copy session that is divided for a split copy process among copy sessions that are currently being performed, the copy session control unit 42 instructs the DPC control unit 48 to stop the split copy process and perform a copy process in one DPC. Whether there exists a copy session that is divided for a split copy process can be determined by the copy session control unit 42 by referring to presence/absence of the original session No. in the copy session management table 47.

When the DPC control unit 48 controls the DPCs so as to stop the split copy process and to allow one DPC to perform the copy process, a free DPC is generated. Then, the copy session control unit 42 instructs the DPC control unit 48 to allow the free DPC 5 to perform a new copy session. At this time, the copy session control unit 42 deletes the content of the copy session management table 47 of the divided copy session and modifies the content of the original copy session management table 47. Then, the copy session control unit 42 generates a new copy session management table 47.

The DPC control unit 48 allows DPC 5 assigned with the new copy session to perform a copy process in response to the instructions from the copy session control unit 42. In this way, even when a copy session is divided into two copy sessions that are assigned to two DPCs, the two copy sessions can be combined into one copy session and the copy session can be assigned to one DPC depending on a condition. Accordingly, a copy process of a new copy session having a large amount of data can be quickly performed and an efficient process can be realized.

Figure 5:
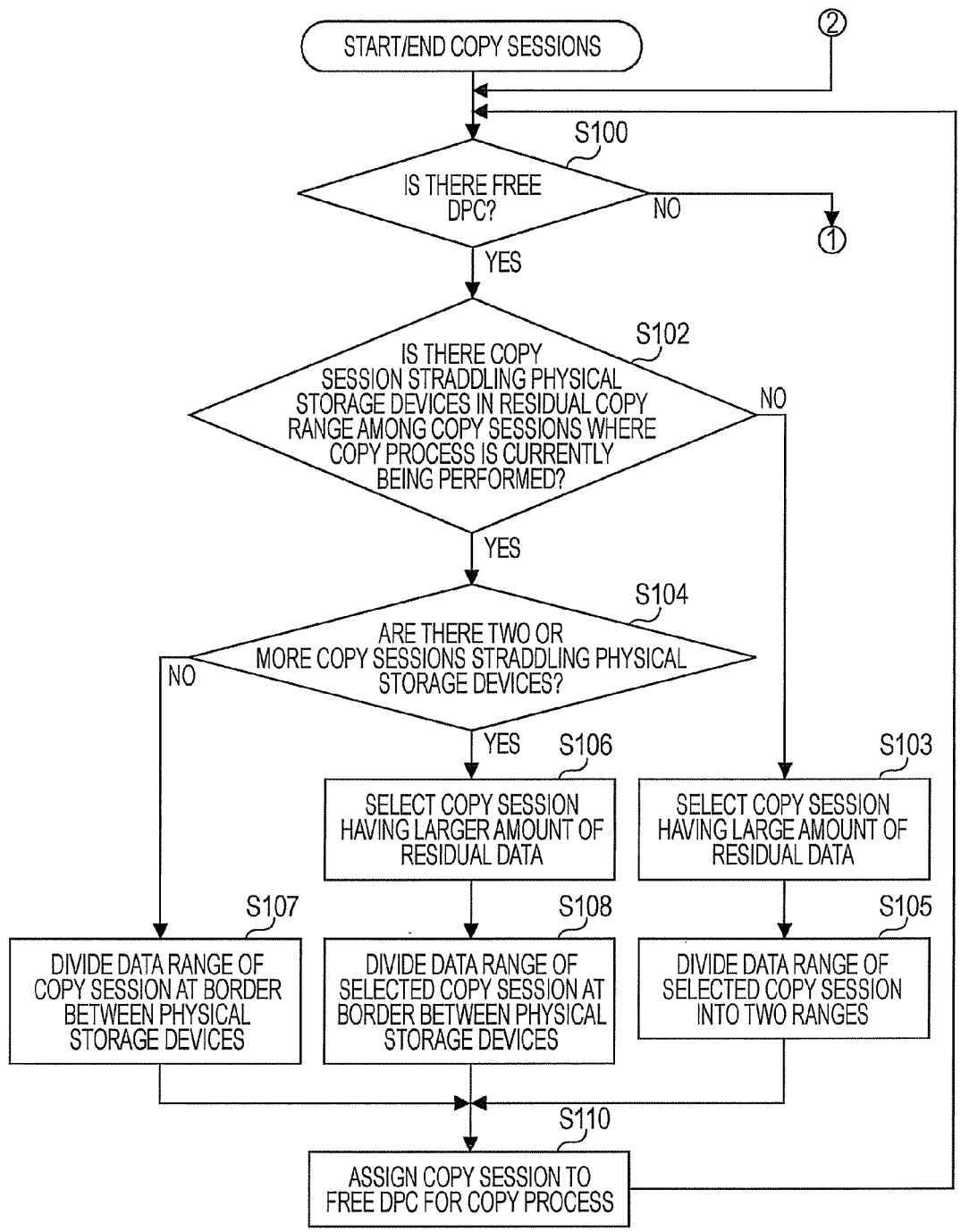
FIG. 5 is a flowchart illustrating an operation of copy process control of the virtualization switch.

Next, a method for controlling a copy process by the above-described control unit 40 is described in detail with reference to the flowcharts in FIGS. 5 and 6. When the copy session control unit 42 of the control unit 40 receives instructions about copy sessions from the host computer 31 or is notified from the DPC control unit 48 that any of the copy sessions performed has ended, the copy session control unit 42 determines whether there is a free DPC with reference to the copy session management tables 47 (step S100).

If the copy session control unit 42 determines that there is a free DPC, the copy session control unit 42 determines whether there is a copy session straddling the physical storage devices X and Y in a residual copy range among the copy sessions where a copy process is currently being performed (step S102). This determination can be made by the copy session control unit 42 by referring to the data bout the copy source volume stored in the copy session management table 47 and the real volume stored in the volume management table 49, as described above.

If there is a copy session straddling the physical storage devices X and Y, the copy session control unit 42 of the control unit 40 determines whether there are two or more such copy sessions by referring to the content of the copy session management tables 47 and the volume management table 49 (step S104).

If there are two or more copy sessions straddling the physical storage devices X and Y, the copy session control unit 42 of the control unit 40 detects the copy session having a larger amount of residual data with reference to the copy session management tables 47. Then, the copy session control unit 42 selects the copy session having a larger amount of residual data from among the copy sessions straddling the physical storage devices X and Y (step S106), divides the data range of the selected copy session into two segments at the border of the physical storage devices X and Y, and instructs the DPC control unit 48 to perform a copy process of one of the two segments in the free DPC (step S108).

If there is one copy session straddling the physical storage devices X and Y, the copy session control unit 42 of the control unit 40 divides the data range of the copy session into two segments at the border of the physical storage devices X and Y, and instructs the DPC control unit 48 to perform a copy process of one of the two segments in the free DPC (step S107).

If it is determined in step S102 that there is no copy session straddling the physical storage devices X and Y in the residual copy range among the copy sessions where a copy process is currently being performed, the copy session control unit 42 of the control unit 40 determines the copy session having a large (or largest) amount of residual data with reference to the copy session management tables 47. Then, the copy session control unit 42 selects the copy session having a large (or largest) amount of residual data (step S103) and divides the data range of the selected copy session into two ranges (step S105).

One of the copy sessions generated through division at the border of the physical storage devices in step S108 or S107 or one of the copy sessions generated through division in step S105 is assigned to a free DPC by the copy session control unit 42 of the control unit 40. The copy session control unit 42 instructs the DPC control unit 48 to allow the free DPC assigned with the copy session to perform a copy process. The DPC control unit 48 controls the DPC assigned with the copy session by the copy session control unit 48, so that the DPC performs the copy process (step S110).

Figure 6:
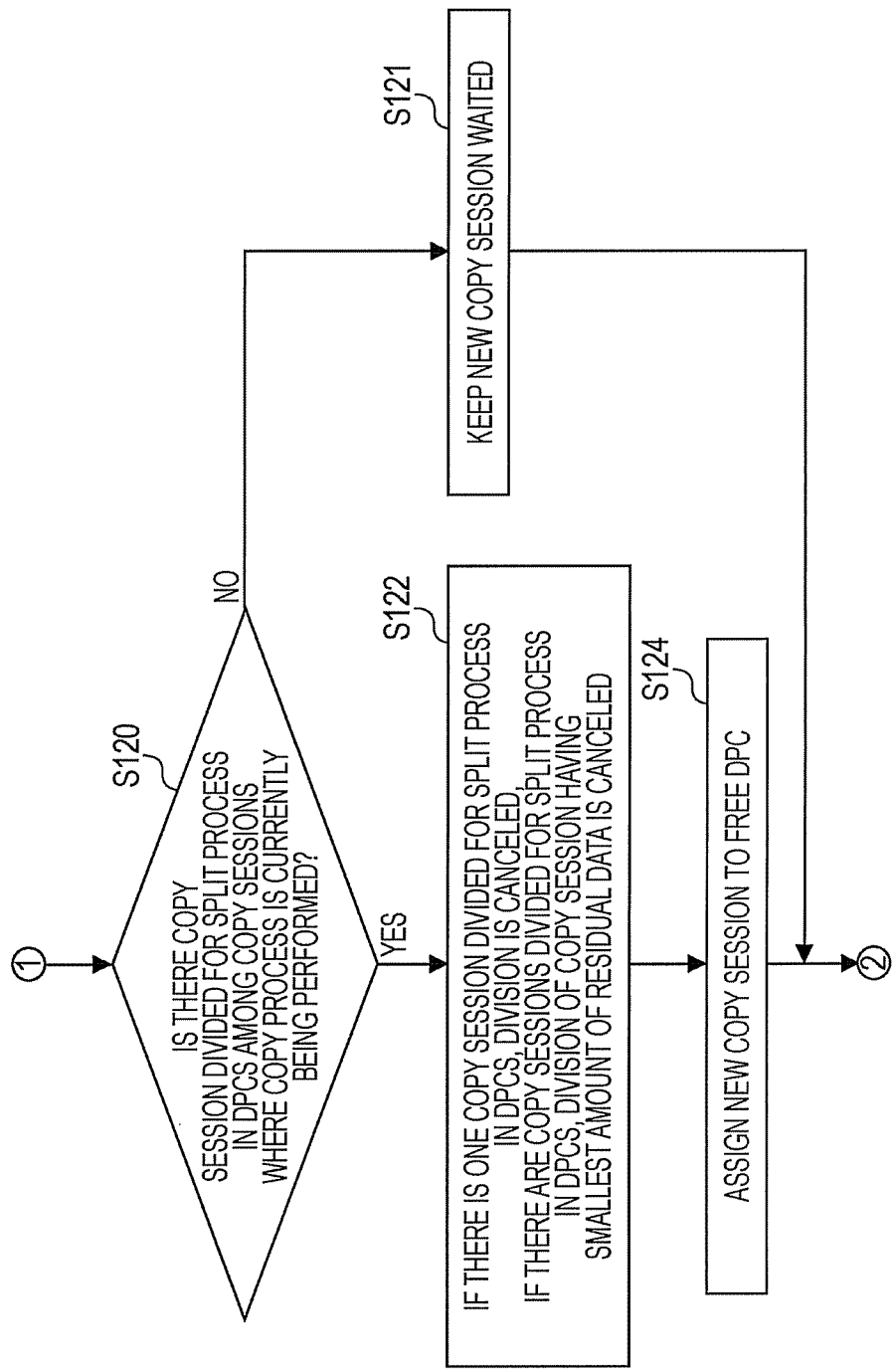
FIG. 6 is a continuation of the flowchart illustrated in FIG. 5.
Figure 7:
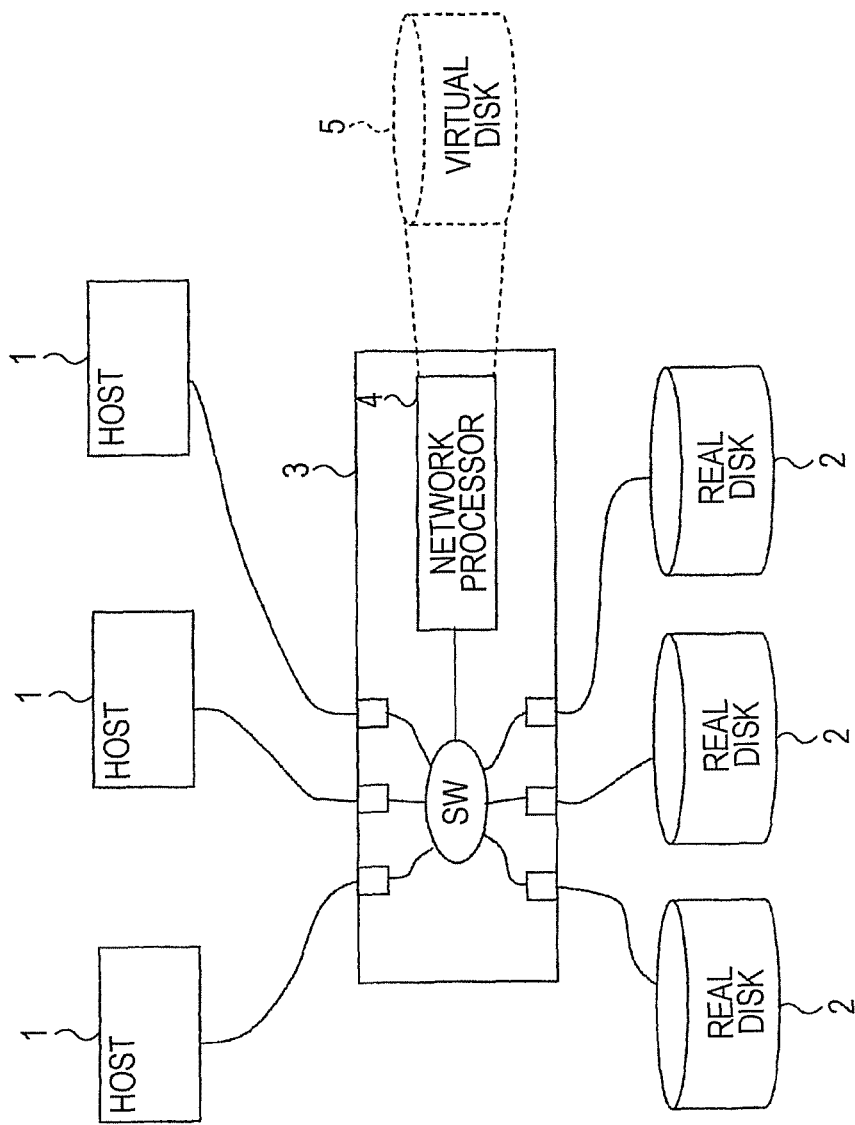
FIG. 7 is a block diagram illustrating a configuration of a computer system including a conventional virtualization switch (fibre channel switch).

If it is determined in step S100 that there is no free DPC, the copy session control unit 42 of the control unit 40 determines whether there is a copy session that is divided for a split process in a plurality of DPCs as in step S110 among the copy sessions where a copy process is currently being performed with reference to the copy session management tables 47 (step S120 in FIG. 6).

If there is a copy session that is divided for a split process in a plurality of DPCs, the copy session control unit 42 of the control unit 40 cancels the assignment of copy sessions for the split process and instructs the DPC control unit 48 to perform the copy process in one DPC. Accordingly, the DPC control unit 48 stops the copy processes in the DPCs specified by the copy session control unit 42 and allows the original DPC to perform the copy process.

At this time, if there are two or more copy sessions that are divided for a split process in a plurality of DPCs, the copy session control unit 42 determines the copy session having a smaller residual copy amount among the copy sessions where the split process is performed with reference to the copy session management tables 47, cancels the division of the copy session having the smaller residual copy amount, and instructs the DPC control unit 48 to perform the copy process in one DPC (step S122).

Then, the copy session control unit 42 of the control unit 40 assigns an unprocessed copy session to the free DPC that has been generated by canceling the division. The copy session control unit 42 instructs the DPC control unit 48 to allow the free DPC assigned with the copy session to perform a copy process. The DPC control unit 48 controls the DPC assigned with the copy session by the copy session control unit 42, so that the DPC performs the copy process (step S124).

If it is determined in step S120 that there is no copy session that is divided for a split process in a plurality of DPCs as in step S110 among the copy sessions where the copy process is currently being performed as a result of reference to the copy session management tables 47 by the copy session control unit 42, the copy session control unit 42 of the control unit 40 keeps a copy session where the copy process has not yet started waited (step S121).

After assigning one of the copy sessions generated through division to the free DPC in step S110 or after assigning an unprocessed copy session to a generated free DPC in step S124, the control unit 40 returns to step S100 to repeatedly perform a process of dividing a copy session or canceling the division so that the copy sessions can be efficiently performed.

In the above-described embodiment, the copy session to be divided is selected on the basis of whether a copy process straddling the physical storage devices X and Y is performed there. Alternatively, the copy session to be divided may be selected on the basis of whether a copy process straddling a plurality of volumes in a physical storage device is performed there.

In such a case, the copy session control unit 42 determines whether a copy process straddling a plurality of volumes is being performed with reference to the copy session management table 47 and the volume management table 49.

In the above-described embodiment, the configuration in which one fibre channel switch Va is provided for one host computer 31 is described. Alternatively, the configuration of the present invention can be applied to a compute system provided with a redundant path having a plurality of multiplexed fibre channel switches.

The data copy method described can be implemented by executing a prepared program by a computer such as a personal computer or a workstation. This program is executed by being recorded on a computer-readable recording medium such as a hard disk, a flexible disk, a CD-ROM, an MO, or a DVD and being read from the recording medium by the computer. This program may be a transmission medium capable of being distributed through a network such as the Internet.

The present invention has been described with respect to one or more specific embodiments. However, it is to be understood that the invention is not limited to the specific embodiments, and many modifications to the embodiments are possible within the scope of the invention, which is defined in the appended claims.

What is claimed is:
1. A virtualization switch that is configured to be connected to a host computer and a plurality of physical storage devices through communication lines, the virtualization switch comprising:
a plurality of communication line connection terminals;
a storage virtualizing unit configured to allow the host computer to recognize a storage area generated by combining at least a part of each of a storage area of the plurality of physical storage devices as a virtual storage device;

a plurality of data pass controllers each configured to perform a copy process to copy data in the storage area virtualized by the storage virtualizing unit, each of the plurality of data pass controllers being connected to a corresponding communication line connection terminal; and a controller configured to control the copy process by assigning copy sessions to the plurality of data pass controllers based on instructions from the host computer, wherein, when the number of data pass controllers is larger than the number of copy sessions, the controller controls to divide data of a copy session assigned to a data pass controller that is currently performing the copy process and to allow a data pass controller that is free and not currently performing any copy process to perform a copy process of divided data of the copy session, wherein the controller determines whether a data pass controller that is free and not currently performing any copy process exists or not in the data controllers when the controller newly receives an instruction of a new copy session from the host computer, determines whether the data pass controllers that perform copy processes of the divided data of the copy session exist or not when determining that a data pass controller that is free and not currently performing does not exist in the data pass controllers, instructs the data pass controllers to stop performing the copy processes of the divided data of the copy session when determining that the data pass controllers that perform copy processes of the divided data of the copy session exist, instructs one of the data pass controllers that stop performing the copy processes of the divided data of the copy session to perform a copy process by combining the divided data of the copy session to generate a data pass controller that is free and not currently performing and instructs the generated data pass controller to perform a copy process of the new copy session from the host computer.

2. A computer system, comprising:

a host computer;

a plurality of physical storage devices; and a virtualization switch configured to be connected to the host computer and the plurality of physical storage devices, wherein the virtualization switch includes:

a plurality of communication line connection terminals;

a storage virtualizing unit configured to allow the host computer to recognize a storage area generated by combining some or all of storage areas of the plurality of physical storage devices as a virtual storage device;

a plurality of data pass controllers each configured to perform a copy process to copy data in the storage area virtualized by the storage virtualizing unit, each of the plurality of data pass controllers being connected to a corresponding communication line connection terminal; and a controller configured to control the copy process by assigning copy sessions based on instructions from the host computer to the plurality of data pass controllers, wherein, when the number of data pass controllers is larger than the number of copy sessions, the controller controls to divide data of a copy session assigned to a data pass controller that is currently performing the copy process and to allow a data pass controller that is free and not currently performing any copy process to perform a copy process of divided data of the copy session, wherein the controller determines whether a data pass controller that is free and not currently performing any copy process exists or not in the data controllers when the controller newly receives an instruction of a new copy session from the host computer, determines whether the data pass controllers that perform copy processes of the divided data of the copy session exist or not when determining that a data pass controller that is free and not currently performing does not exist in the data pass controllers, instructs the data pass controllers to stop performing the copy processes of the divided data of the copy session when determining that the data pass controllers that perform copy processes of the divided data of the copy session exist, instructs one of the data pass controllers that stop performing the copy processes of the divided data of the copy session to perform a copy process by combining the divided data of the copy session to generate a data pass controller that is free and not currently performing, and instructs the generated data pass controller to perform a copy process of a new copy session from the host computer.

3. A data copy method for copying data in a storage area virtualized by a storage virtualizing unit in a virtualization switch that is configured to be connected to a host computer and a plurality of physical storage devices through communication lines and that includes a plurality of communication line connection terminals, the storage virtualizing unit being configured to allow the host computer to recognize a storage area generated by combining some or all of storage areas of the plurality of physical storage devices as a virtual storage device, the data copy method comprising:

assigning, by a controller in the virtualization switch, copy sessions to a plurality of data pass controllers based on instructions from the host computer, each of the plurality of data pass controllers being connected to a corresponding communication line connection terminal;

dividing, by the controller, data of a copy session assigned to a data pass controller that is currently performing the copy process when the number of data pass controllers is larger than the number of copy sessions;

allowing, by the controller, a free data pass controller that is not currently performing any copy process to perform a copy process of divided data of the copy session;

determining, by the controller, whether a data pass controller that is free and not currently performing any copy process exists or not in the data controllers when the controller newly receives an instruction of a new copy session from the host computer;

determining, by the controller, whether the data pass controllers that perform copy processes of the divided data of the copy session exist or not when determining that a data pass controller that is free and not currently performing does not exist in the data pass controllers;

instructing, by the controller, the data pass controllers to stop performing the copy processes of the divided data of the copy session when determining that the data pass controllers that perform copy processes of the divided data of the copy session exist;

instructing, by the controller, one of the data pass controllers that stop performing the copy processes of the divided data of the copy session to perform a copy process by combining the divided data of the copy session to generate a data pass controller that is free and not currently performing; and instructing, by the controller, the generated data pass controller to perform a copy process of a new copy session from the host computer.

* * * * *